United States Patent
Lin et al.

(10) Patent No.: US 10,203,038 B2
(45) Date of Patent: Feb. 12, 2019

(54) CONTROLLING MECHANISM FOR A THREE-WAY VALVE

(71) Applicant: Xiamen Runner Industrial Corporation, Xiamen (CN)

(72) Inventors: Chun-Hui Lin, Xiamen (CN); Shun-Chuan Zheng, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 0 days.

(21) Appl. No.: 15/813,239

(22) Filed: Nov. 15, 2017

(65) Prior Publication Data

US 2018/0180187 A1   Jun. 28, 2018

(30) Foreign Application Priority Data

Dec. 22, 2016   (CN) .......................... 2016 1 1200755

(51) Int. Cl.
| | |
|---|---|
| *F16K 11/10* | (2006.01) |
| *F16K 11/087* | (2006.01) |
| *E03C 1/04* | (2006.01) |
| *F16K 15/02* | (2006.01) |
| *F16K 11/22* | (2006.01) |
| *F16K 31/524* | (2006.01) |
| *F16K 31/24* | (2006.01) |

(52) U.S. Cl.
CPC .......... *F16K 11/105* (2013.01); *E03C 1/0408* (2013.01); *F16K 11/0873* (2013.01); *F16K 11/22* (2013.01); *F16K 15/025* (2013.01); *F16K 31/524* (2013.01); *E03C 1/0405* (2013.01); *E03C 2201/30* (2013.01); *F16K 31/24* (2013.01)

(58) Field of Classification Search
CPC .... F16K 11/105; F16K 11/22; F16K 11/0873; F16K 15/025; F16K 31/24; F16K 31/52; F16K 31/524; E03C 1/0408; E03C 1/0405; E03C 2201/30
USPC ........ 251/229, 320, 362–363, 337, 208–209; 137/801
See application file for complete search history.

(56) References Cited

U.S. PATENT DOCUMENTS

| | | | | |
|---|---|---|---|---|
| 5,456,448 A * | 10/1995 | Chou | ........................ | E03C 1/04 251/229 |
| 6,942,195 B2 * | 9/2005 | Kao | ....................... | E03C 1/0404 251/339 |
| 7,143,997 B2 * | 12/2006 | Kao | ......................... | E03C 1/04 251/339 |
| 7,950,624 B2 * | 5/2011 | Liao | ............................ | E03C 1/08 222/509 |
| 8,028,356 B2 * | 10/2011 | Kao | .......................... | E03C 1/08 137/801 |

* cited by examiner

*Primary Examiner* — John Bastianelli
(74) *Attorney, Agent, or Firm* — Chun-Ming Shih

(57) ABSTRACT

A controlling mechanism for a three-way valve includes a transmission axis movably received in the valve and having first teeth formed on a free end thereof. A rotation axis is movable and intermittently rotatable in the valve and having second teeth integrally formed on the rotation axis to correspond to the first teeth. A spring is received inside the valve to provide a recoil force to the rotation axis to maintain the second teeth of the rotation axis to be in contact with the first teeth of the transmission axis so that movement of the transmission drives the rotation axis to move and rotate simultaneously for selectively blocking the inlet of the valve.

9 Claims, 10 Drawing Sheets

CONTROLLING MECHANISM FOR A THREE-WAY VALVE

CROSS REFERENCE

This application claims the priority of Chinese Application No. 201611200755.1, filed on Dec. 22, 2016 and the entirety thereof is herein incorporated with reference.

TECHNICAL FIELD

The preferred embodiment of the present invention is related to the field of a controlling mechanism and, more particularly, to a controlling mechanism for a three-way valve installed in a showerhead so that the operator is able to easily and temporarily suspend waterflow from the water source as well as waterflow direction(s).

BACKGROUND OF THE INVENTION

When taking a shower and a temporary suspension of water supply from the water source is necessary, the only thing the user can do is to shut down the faucet by turning the knob to completely stop water outflow. Normally, a shower head provided inside the shower room allows the user to take a shower via a single switch to determine water output. If the user wants to change the water output pattern, the user will have to first remove the shower head from the shower seat and then manually rotate the diverter on the shower head to accomplish the objective. In order to accomplish different requirements, there are commercially available showerheads on the market for the user to choose from so that the user can enjoy intermittent impact from the water due to the pattern of the showerhead so chosen. Still, the user currently can use a three-way valve body to communicate with up to two showerheads to fulfill the needs. With this three-way valve body, the user can seemly easily change the waterflow as well as water pattern due to the chosen showerhead(s). According to the technology available in the market, the user will either rotate the knob or handle all the way to the bottom to accomplish the changes, which is difficult and too time consuming especially when the user is soaked in foam or covered with soap.

In order to obviate or mitigate the aforementioned problem, the preferred embodiment of the present invention is to provide a controlling mechanism for a three-way valve to allow the user to easily operate the water output as well as water output pattern.

SUMMARY OF THE INVENTION

It is an objective of the preferred embodiment of the present invention to provide a controlling mechanism for a three-way valve body. The controlling mechanism includes a transmission axis adapted to be movably received in the valve and having first teeth formed on a free end thereof, a rotation axis adapted to be movable and intermittently rotatable in the valve and having second teeth integrally formed on the rotation axis to correspond to the first teeth; and a spring adapted to be securely received inside the valve to provide a recoil force to the rotation axis to maintain the second teeth of the rotation axis to be in contact with the first teeth of the transmission axis so that movement of the transmission drives the rotation axis to move and rotate simultaneously for selectively blocking the inlet of the valve.

Another objective of the preferred embodiment of the present invention is that the first teeth and the second teeth respectively are equally spaced and the rotation axis has an upward movement by the spring.

Another objective of the preferred embodiment of the present invention is that a rotation cylinder is provided with an extension integrally formed on a bottom portion thereof and a knob is adapted to be rotatably mounted on the valve to drive the rotation cylinder for allowing the extension of the rotation cylinder to selectively block one of two outlets or be located at a position allowing waterflow from an inlet of the valve to flow out of the two outlets simultaneously.

Still another objective of the preferred embodiment of the present invention is that the first teeth and the second teeth are respectively inclined and equally spaced.

Still another objective of the preferred embodiment of the present invention is that the rotation axis has a block formed on a bottom portion thereof for selectively blocking the inlet of the valve.

Still another objective of the preferred embodiment of the present invention is that a rotation cover adapted to be movable on top of the valve to drive the transmission axis to linearly move.

Still another objective of the preferred embodiment of the present invention is that a knob is adapted to be rotatable relative to the valve and has a wing formed on a side wall thereof, the rotation cylinder has a slit defined in a side wall thereof to correspond to and receive therein the wing of the knob so that rotation of the knob drives the rotation cylinder to rotate.

Still another objective of the preferred embodiment of the present invention is that a knob is adapted to be rotatable relative to the valve and has a wing formed on a side wall thereof, the rotation cylinder has a slit defined in a side wall thereof to correspond to and receive therein the wing of the knob so that rotation of the knob drives the rotation cylinder to rotate.

DETAILED DESCRIPTION OF THE PREFERRED EMBODIMENT

Preferred embodiment(s) of the present invention in combination with the attached drawings shall be provided in detail in the following description. However, the given description is for example purpose only and should not be deemed as a limiting to the scope of the present invention in any way.

In order to make it easy to carry out the preferred embodiment of the present invention, a detailed description of the parts of the invention, supported with figures is provided here. As each part of the preferred embodiment of the present invention has many features, it is made easy to read, by referring to each feature with a number included in the parts description text. The number of the parts feature(s) is indicated here by starting it sequentially from the number 1, wherever a part feature appears in a text, an associated serial number is directly assigned.

Figure 1:
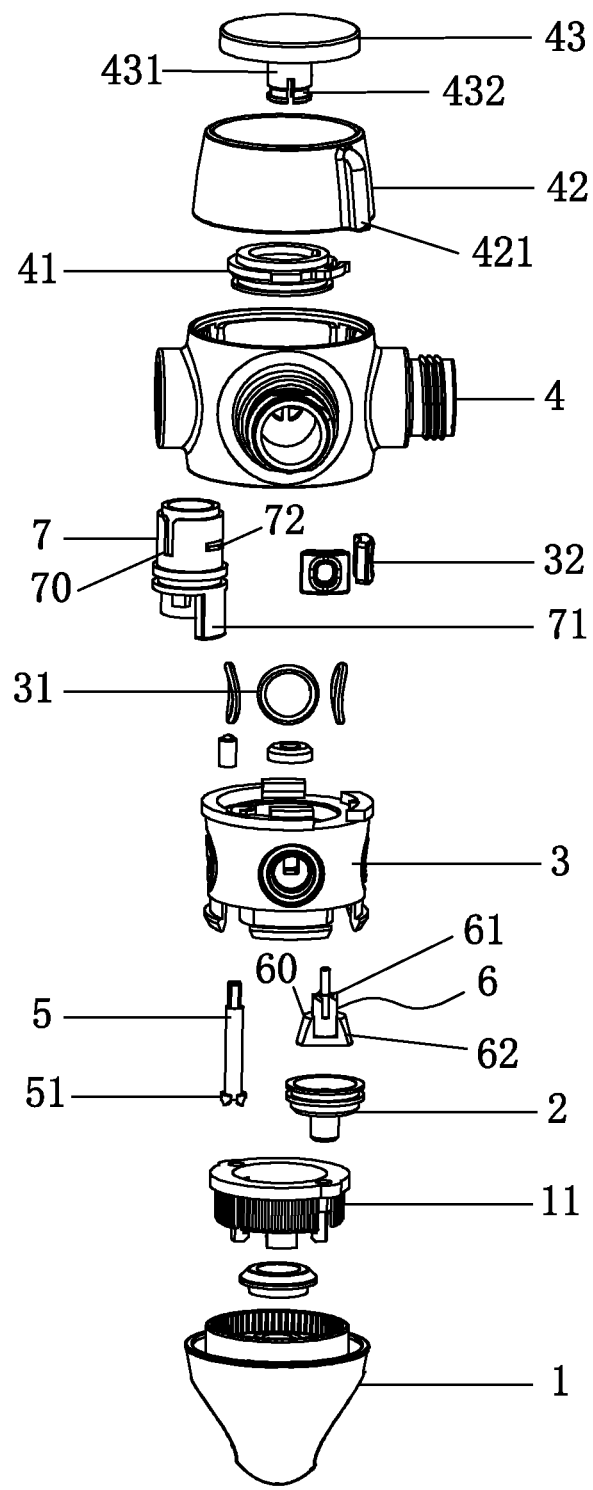
FIG. 1 is an exploded perspective view of a first embodiment of the controlling mechanism of the preferred embodiment of the present invention.
Figure 2:
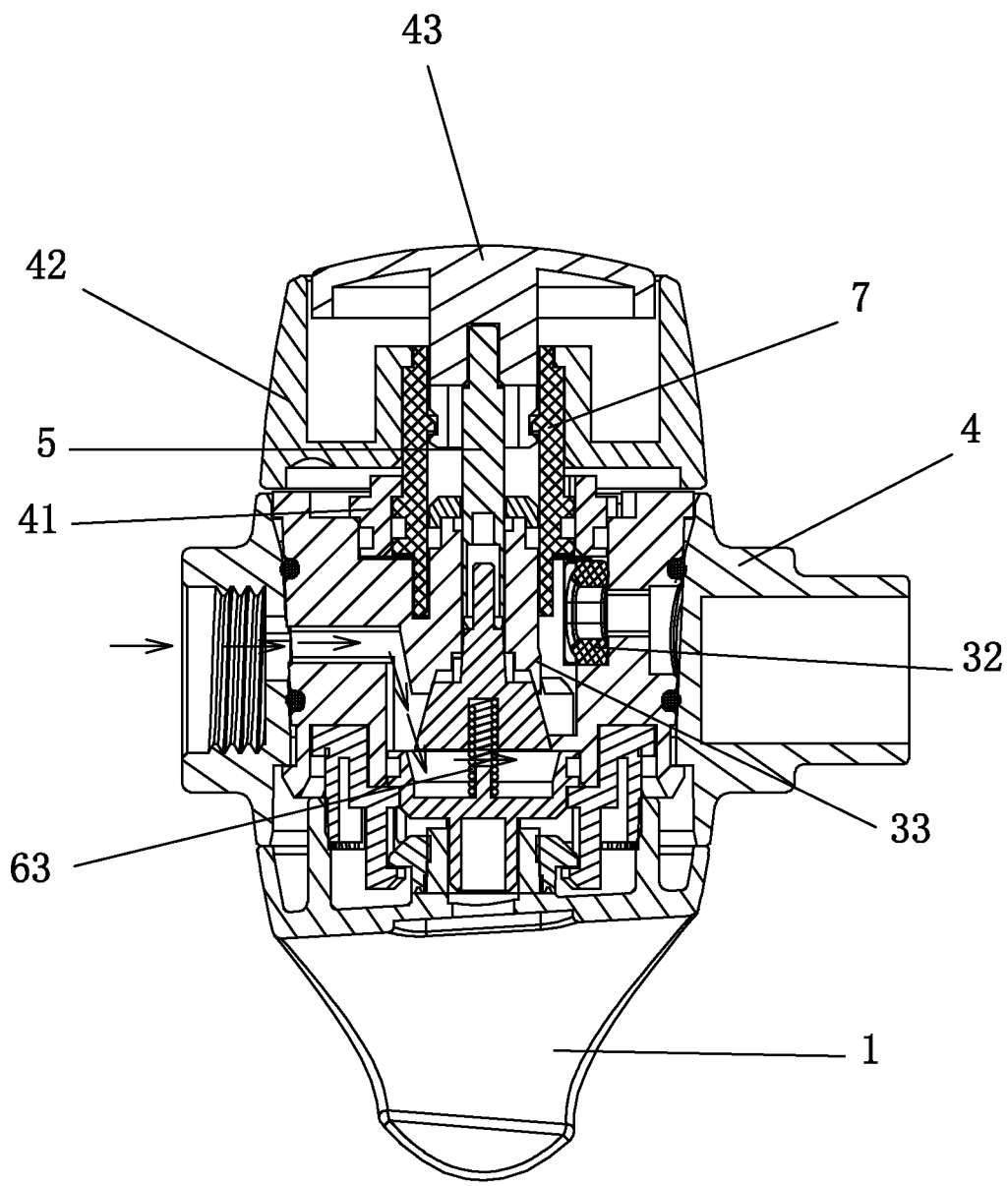
FIG. 2 is a cross sectional view showing the assembled controlling mechanism of the preferred embodiment of the present invention, wherein the outlet of the inlet in communication with the water source is blocked by the block of the rotation axel.

With reference to FIGS. 1 and 2, the controlling mechanism constructed in accordance with the preferred embodiment of the present invention includes a seat 1 adapted for connection to a showerhead, a seat bracket 11 received inside the seat 1, a sealing base 2 with an extension extended into the seat bracket 11 to position the position of the sealing base 2 inside the seat bracket 11 and to prevent any liquid leakage, a valve body 3 defined therein an inlet for communication with a water source, a first outlet and a second outlet (not numbered) respectively communicating with the inlet, wherein inlets of the first outlet and the second outlet are at the same level (height) inside the valve body 3 and outlet of the inlet and the inlets of the first outlet and the second outlet are not at the same level (height), a casing 4 enclosing therein the valve body 3 and having side holes (not numbered) defined through a side wall of the valve body 3 to communicate the inlet and the outlets of the valve body 3, a transmission axis 5 movably received inside the casing 4 and the valve body 3, a rotation axis 6 securely connected to one free end of the transmission axis 5 and also movably and rotatably received inside the casing 4 and the valve body 3 and a hollow rotation cylinder 7 selectively rotatable between the casing and the valve body 3.

Figure 3:
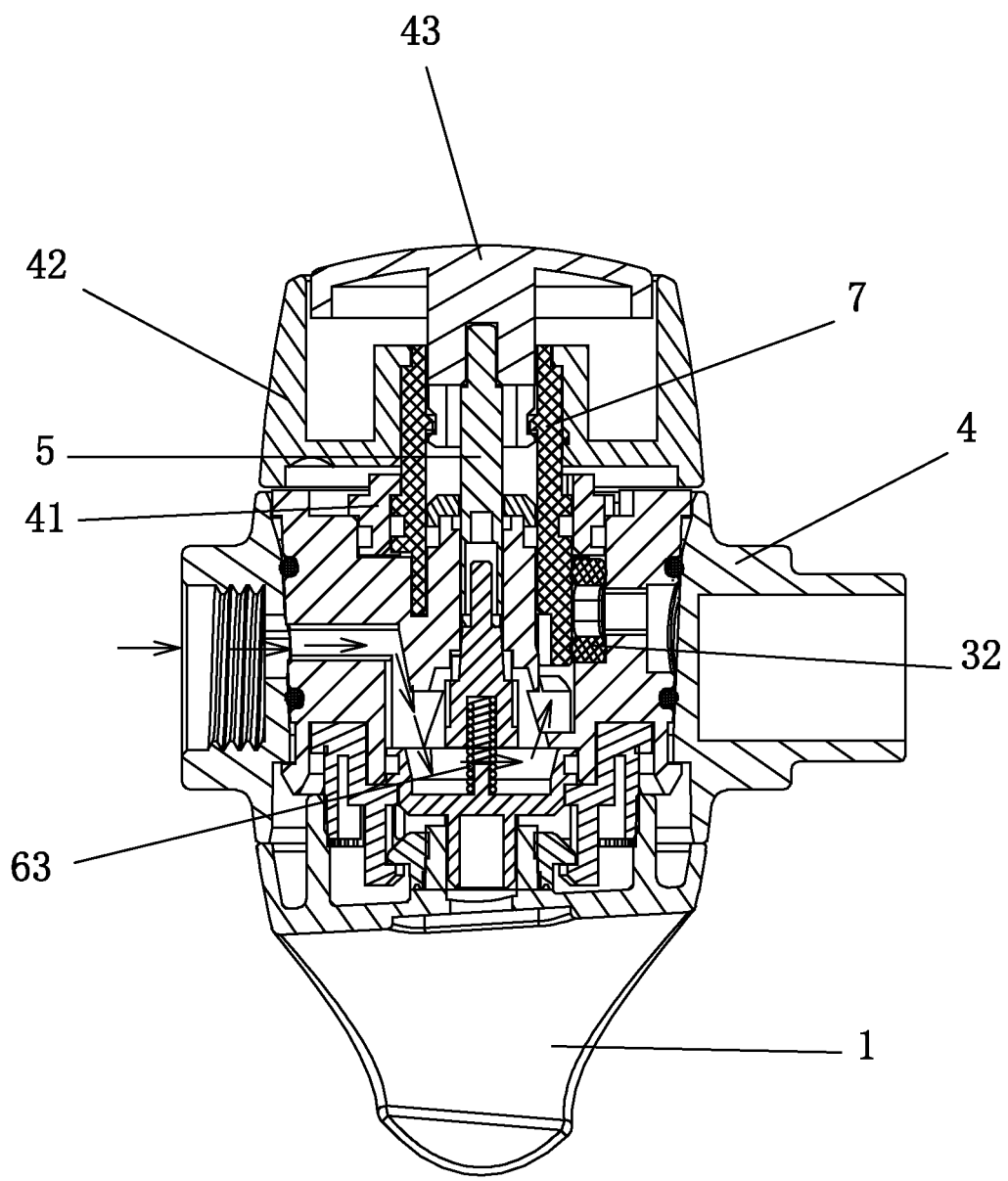
FIG. 3 a cross-sectional view showing the assembled controlling mechanism of the preferred embodiment of the present invention, wherein the outlet of the inlet in communication with the water source is free from interference by the block of the rotation axel such that water from the water source is able to flow in a direction indicated by the arrow in the drawing.

A ratchet device is provided to control the movement of the rotation axis 6 and includes a first undulated teeth 51 formed on a bottom end of the transmission axis 5, a second undulated teeth 61 formed on a top portion of the rotation axis 6 to correspond and connect to the first undulated teeth 51 of the transmission axis 5, a spring 63 received inside the sealing base 2 and a free end of which is abutted against a bottom end of the rotation axis 6, as shown in FIGS. 2 and 3, to provide an upward force to the rotation axis 6 to allow the rotation axis 6 to maintain in contact with the transmission axis 5 and a series of equally-spaced first stops 33 formed on an inner wall of the valve body 3 to correspond and selectively connect to a series of equally-spaced second stops 60 formed on the rotation axis 6 such that when the first stops 33 engage with the second stops 60, the rotation axis 6 is prevented from movement inside the valve body 3. It is noted that the rotation axis 6 has a block 62 formed on a bottom thereof to correspond to the inlet of the valve body 3.

Furthermore, as depicted in the accompanying drawings, a sealing ring 31 is provided between the casing 4 and the inlet as well as the outlets. Also, entrances of the first outlet and the second outlet are provided with a seal pad 32. The rotation cylinder 7 has an extension 71 extending outward to correspond to either one of the first outlet and the second outlet. The rotation cylinder 7 has a slit 70 longitudinally defined in a side wall thereof. A knob 42 is rotatably provided on top of the casing 4 and has a wing 421 extending outward from a side wall thereof to correspond to the slit 70 of the rotation cylinder 7 such that after the wing 421 is extended into the slit 71 of the rotation cylinder 7, rotation of the knob 42 drives the rotation cylinder 7 to rotate as well. As a result, rotation of the knob 42 drives the rotation cylinder 7 to rotate and one of the outlets (the first outlet and the second outlet) is selectively stopped depending on the position of the extension 71 of the rotation cylinder 7. On top of the knob 42, a pushbutton 43 is provided to cover a top opening of the knob 42 and has legs 431 integrally extending downward and having an annular recess 432 defined in a bottom end thereof to correspond to bosses 72 formed on an outer periphery of the rotation cylinder 7.

With reference to FIGS. 2 and 3, it is noted that when the controlling mechanism of the preferred embodiment of the present invention is assembled, the seat bracket 11 is securely received inside the seat 1 and the sealing base 2 is also securely seated on top of the seat bracket 11. One free end of the spring 63 is seated on the sealing base 2 and the other free end of the spring 63 is abutted against a bottom face of the rotation axis 6. The transmission axis 5 is on top of the rotation axis 6 with the first undulated teeth 51 engaged with the second undulated teeth 61 and both the transmission axis 5 and the rotation axis 6 are received inside the rotation cylinder 7 which is received in the valve body 3.

With the transmission axis 5 and the rotation axis 6 securely received inside the rotation cylinder 7 as well as the valve body 3, a downward force applied to the pushbutton 43 forces the transmission axis 5 as well as the rotation axis 6 to move downward, which allows the block 62 of the rotation axis 6 to block the entrance of the inlet of the valve body 3. Therefore, waterflow from the water source is shown as the arrow shown in FIG. 2. Due to the engagement between the first stops 33 of the valve body 3 and the second stops 62 of the rotation axis 6, the rotation axis 6 is retained at the position to keep blocking the entrance of the inlet of the valve body 3.

Figure 4:
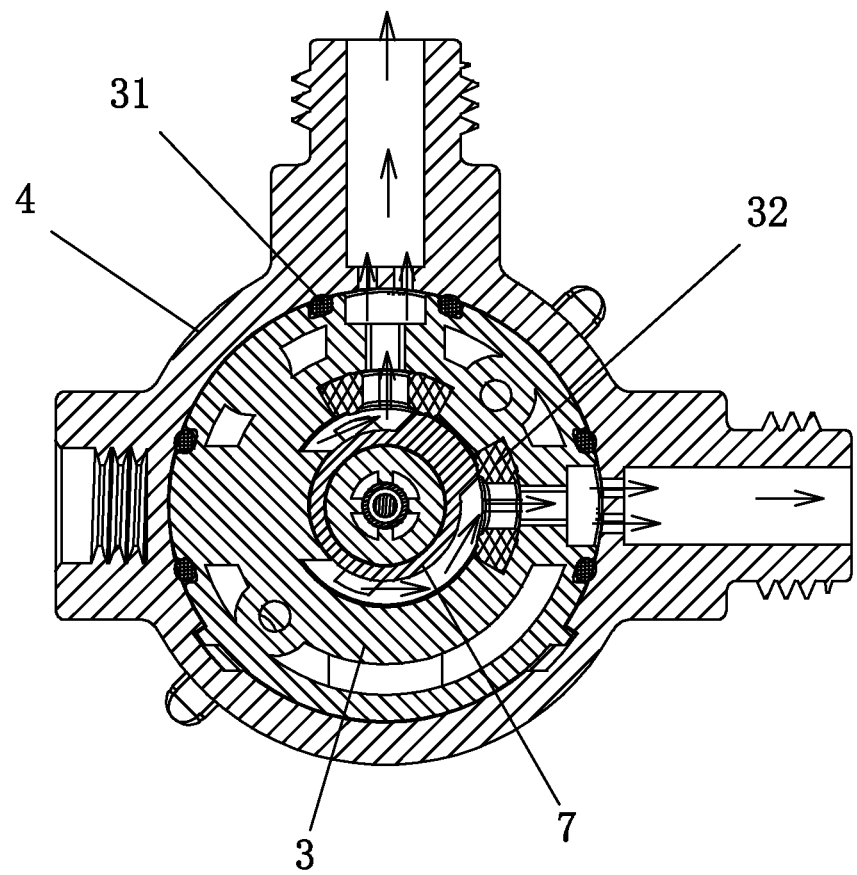
FIG. 4 is a top cross-sectional view showing the extension of the rotation cylinder is in between two outlets such that water flowing from the outlet of the inlet is able flow out of the two outlets simultaneously.
Figure 5:
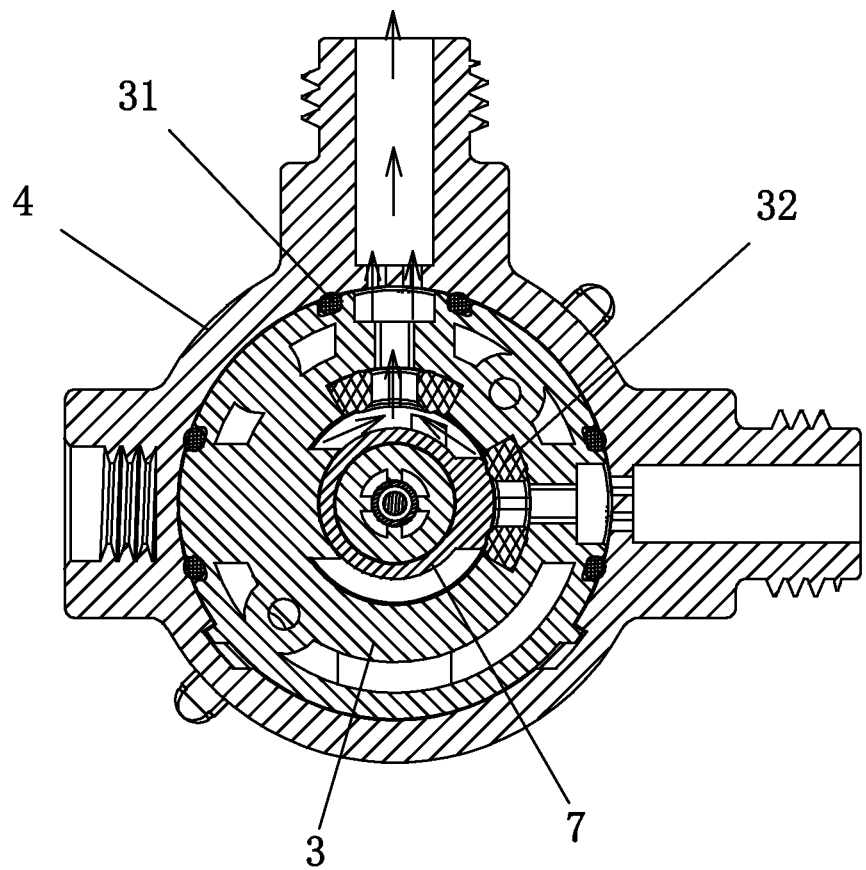
FIG. 5 is a top cross-sectional view showing the extension of the rotation cylinder is blocking one of the two outlets such that water flowing from the outlet of the inlet is able to flow out of one of the two outlets.
Figure 6:
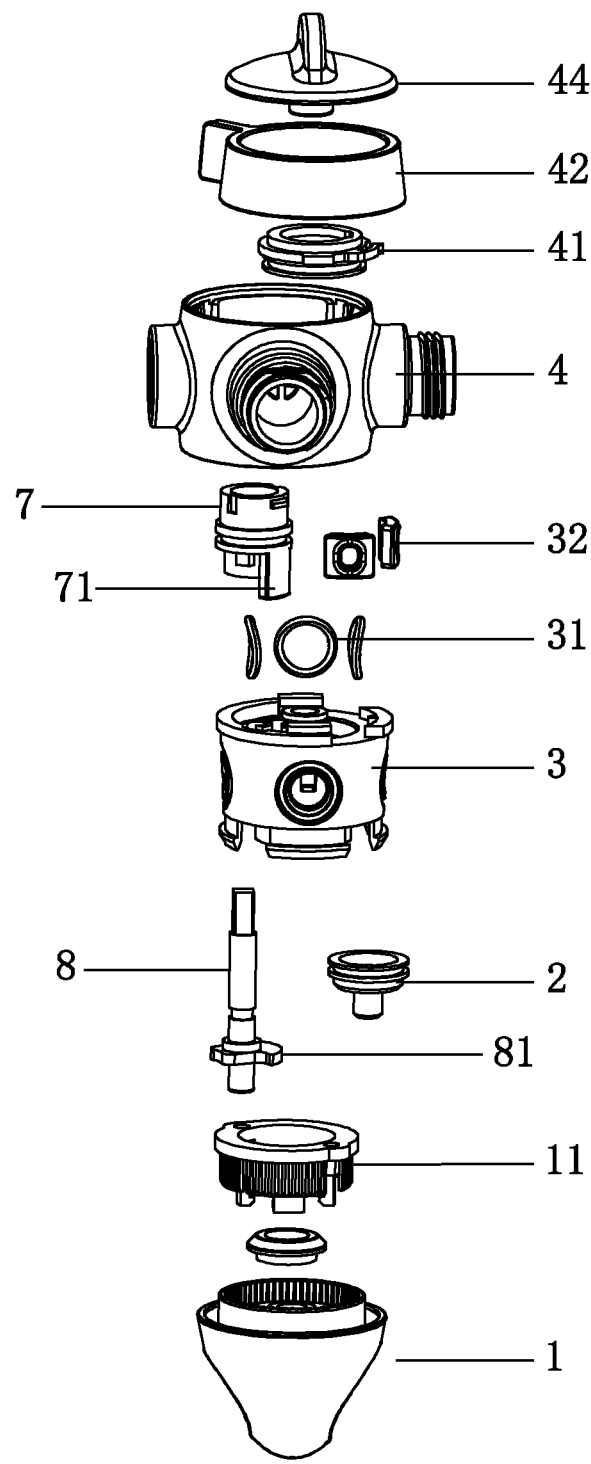
FIG. 6 is an exploded perspective view of the controlling mechanism of the second embodiment of the preferred embodiment of the present invention.

Again, as the orientation of both the first and second undulated teeth 51, 62 is inclined, when a downward force is applied to the pushbutton 43 to allow the first undulated teeth 51 to force the rotation axis 6 to rotate, the second stops 62 escape from the space between two adjacent first stops 33, which allows the transmission axis 5 and the rotation axis 6 to move upward due to the recoil force from the spring 63 and that opens the waterflow from the inlet to the outlet. However, when the knob 42 is rotated, due to the wing 421 is inserted into the slit 71 of the rotation cylinder 7, the rotation cylinder 7 also is rotated, which allows the extension 70 to either be positioned at a location between the two outlets or at a location to block one of the outlets, as shown in FIGS. 4 and 5. Therefore, it is concluded that with the controlling mechanism of the preferred embodiment of the present invention, a tap on the pushbutton 43 stops the water from the water source to flow into the inlet of the valve body 3 and then another tap on the pushbutton 43 allows the water to flow into the first outlet and/or the second outlet.

With reference to FIGS. 6-10, a second embodiment of the preferred embodiment of the present invention is shown, wherein same elements in this embodiment bear the same reference numeral and are omitted for brevity. Following description focuses on the differences between the first embodiment and the second embodiment of the preferred embodiments of the present invention.

Figure 7:
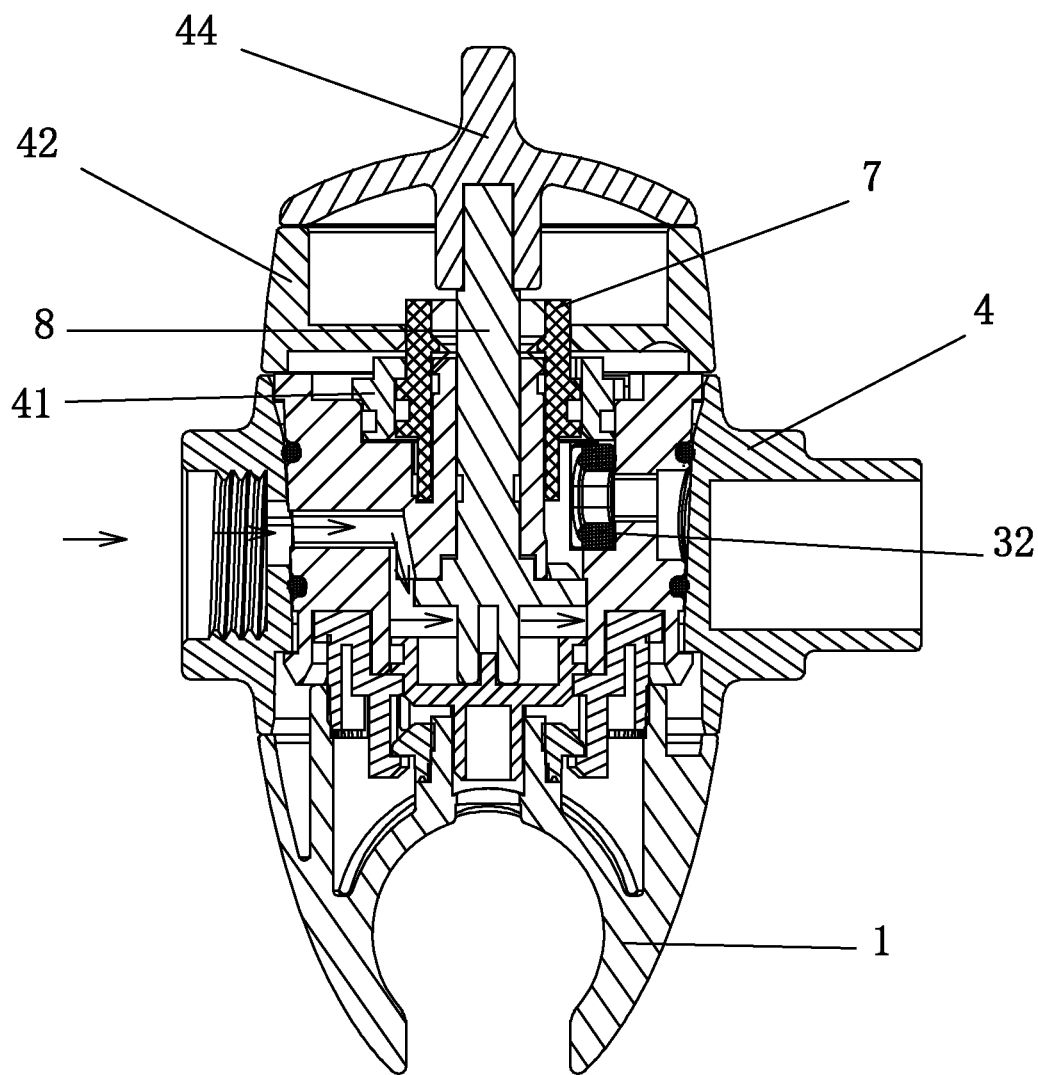
FIG. 7 is a cross-sectional view showing the assembled controlling mechanism of the preferred embodiment of the present invention, wherein the outlet of the inlet in communication with the water source is blocked.
Figure 8:
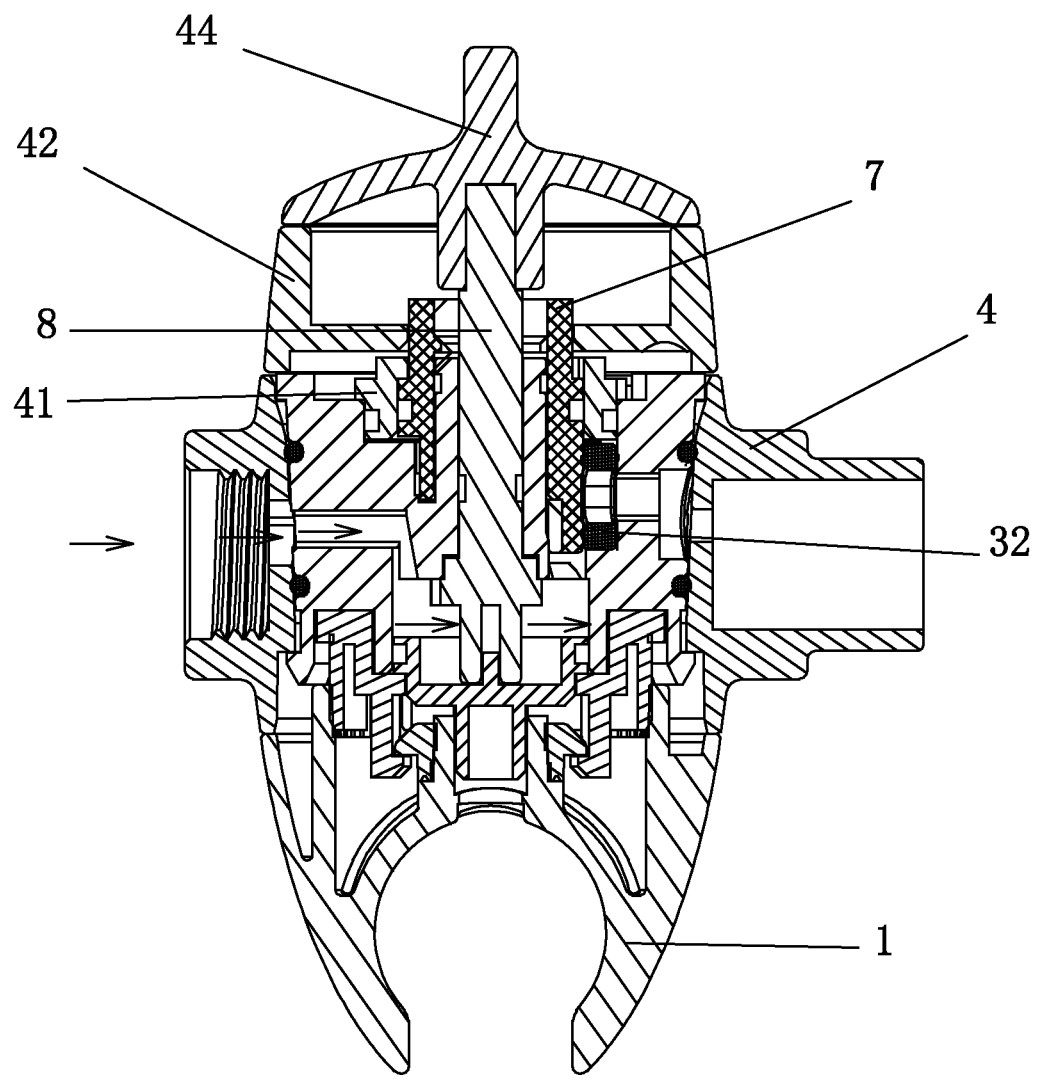
FIG. 8 is a cross-sectional view showing that the outlet of the inlet in communication with the water source is free from interference.
Figure 9:
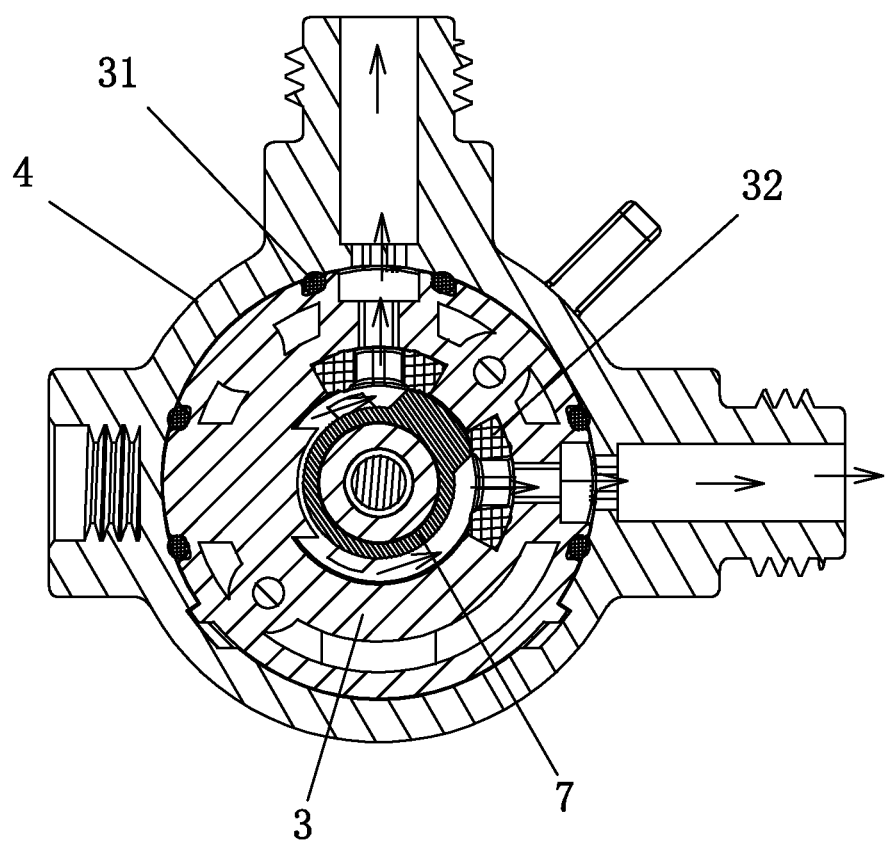
FIG. 9 is a top cross-sectional view showing that the two outlets in communication with two showerheads are free from any interference.
Figure 10:
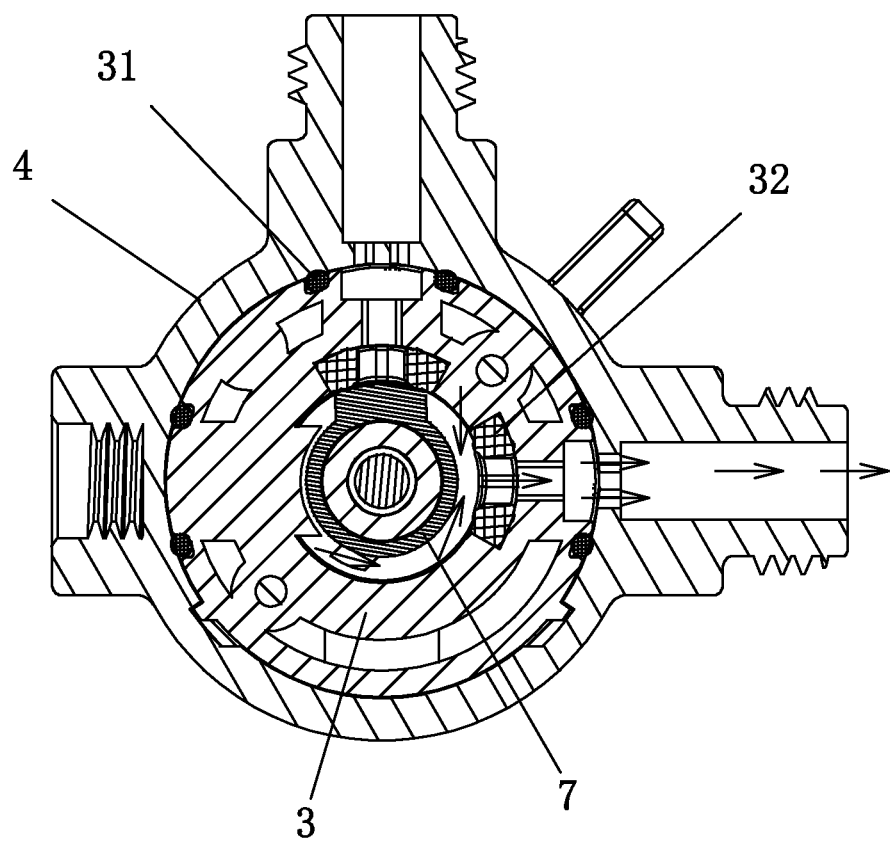
FIG. 10 is a top cross-sectional view showing that one of the two outlets in communication with two showerheads is blocked and water from the outlet of the inlet can only exit from the free outlet.

A rotation cover 44 is provided to cover the top opening of the knob 42 and has a hollow extension integrally extended therefrom and a collar-like rotation switch 8 having a tapered distal free end extended into the hollow extension of the rotation cover 44 and a stop 81 formed on a bottom portion thereof. Thus, when the controlling mechanism of this preferred embodiment of the present invention is assembled, it is noted that the rotation switch 8 is driven by the rotation cover 44 and the stop 81 of the rotation switch 8 is located at an outlet of the inlet of the valve body 3. Therefore, when the rotation cover 44 is rotated, the rotation switch 8 is rotated as well, which drives the stop 81 of the rotation switch 8 to move to the inlet and block the waterflow from the water resource to flow into the valve body 3, as shown in FIG. 7. When the rotation cover 44 continues to rotate to drive the rotation switch 8 to rotate as well, the stop 81 is moved away from the inlet of the valve body 3, which allows the waterflow from the water source to flow as indicated by the arrow in FIG. 8. Therefore, the operator is able to control water inlet directly from the rotation cover 44. Thereafter, the operator is able to rotate the knob 42 to control the rotation of the rotation cylinder 7 to allow the extension to be positioned in either one of the outlets of the valve body 3, as shown in FIG. 10, or at a location between the two outlets of the valve body 3 to allow the waterflow to flow out of the two outlets simultaneously.

After a detailed description of the preferred embodiment (s) has been provided, any skilled person in the art would easily understand the description so provided is for example purpose only. The scope for protection of the present invention is defined by the attached claims. Any skilled person in the art would easily amend, modify or alter the elements/devices of the present invention without departing from the principle essence and spirit of the present invention. However, the amendment, modification or alteration shall fall within the protection scope sought of the present invention.

What is claimed is:

1. A controlling mechanism for a three-way valve having one inlet and two outlets, the controlling mechanism comprising:
   a transmission axis adapted to be linear movably received in the valve and having first teeth formed on a free end thereof;
   a rotation axis adapted to be linear movable and intermittently rotatable in the valve and having second teeth integrally formed on the rotation axis to correspond to the first teeth;
   a spring adapted to be securely received inside the valve to provide a recoil force to the rotation axis to maintain the second teeth of the rotation axis to be in contact with the first teeth of the transmission axis so that linear movement of the transmission axis drives the rotation axis to linearly move and rotate simultaneously for selectively blocking the inlet of the valve and;
   a rotation cylinder provided with an extension integrally formed on a bottom portion thereof and a knob adapted to be rotatably mounted on the valve to drive the rotation cylinder for allowing the extension of the rotation cylinder to selectively block one of two outlets or be located at a position allowing waterflow from an inlet of the valve to flow out of the two outlets simultaneously.

2. The controlling mechanism as claimed in claim 1, wherein the first teeth and the second teeth respectively are equally spaced and the rotation axis has an upward movement by the spring.

3. The controlling mechanism as claimed in claim 1, wherein the first teeth and the second teeth are respectively inclined and equally spaced.

4. The controlling mechanism as claimed in claim 1, wherein the rotation axis has a block formed on a bottom portion thereof for selectively blocking the inlet of the valve.

5. The controlling mechanism as claimed in claim 4, wherein the rotation axis has a block formed on a bottom portion thereof for selectively blocking the inlet of the valve.

6. The controlling mechanism as claimed in claim 5 further comprising a rotation cover adapted to be movable on top of the valve to drive the transmission axis to linearly move.

7. The controlling mechanism as claimed in claim 4, wherein a knob is adapted to be rotatable relative to the valve and has a wing formed on a side wall thereof,
   the rotation cylinder has a slit defined in a side wall thereof to correspond to and receive therein the wing of the knob so that rotation of the knob drives the rotation cylinder to rotate.

8. The controlling mechanism as claimed in claim 5, wherein a knob is adapted to be rotatable relative to the valve and has a wing formed on a side wall thereof,
   the rotation cylinder has a slit defined in a side wall thereof to correspond to and receive therein the wing of the knob so that rotation of the knob drives the rotation cylinder to rotate.

9. The controlling mechanism as claimed in claim 6, wherein a knob is adapted to be rotatable relative to the valve and has a wing formed on a side wall thereof,
   the rotation cylinder has a slit defined in a side wall thereof to correspond to and receive therein the wing of the knob so that rotation of the knob drives the rotation cylinder to rotate.

\* \* \* \* \*